(12) United States Patent
Ummadi et al.

(10) Patent No.: US 9,888,706 B2
(45) Date of Patent: Feb. 13, 2018

(54) FROZEN CONFECTION PRODUCT AND A METHOD OF PREPARING SUCH

(71) Applicant: NESTEC S.A., Vevey (CH)

(72) Inventors: Madhavi Ummadi, Bakersfield, CA (US); Nishant Ashok Joshi, Sioux City, IA (US)

(73) Assignee: Nestec S.A., Vevey (CH)

( * ) Notice: Subject to any disclaimer, the term of this patent is extended or adjusted under 35 U.S.C. 154(b) by 43 days.

(21) Appl. No.: 14/439,707

(22) PCT Filed: Oct. 17, 2013

(86) PCT No.: PCT/EP2013/071729
§ 371 (c)(1),
(2) Date: Apr. 30, 2015

(87) PCT Pub. No.: WO2014/067791
PCT Pub. Date: May 8, 2014

(65) Prior Publication Data
US 2015/0245638 A1 Sep. 3, 2015

(30) Foreign Application Priority Data

Oct. 31, 2012 (WO) ................ PCT/US2012/062817

(51) Int. Cl.
*A23G 9/46* (2006.01)
*A23G 9/20* (2006.01)
*A23G 9/38* (2006.01)

(52) U.S. Cl.
CPC ................ *A23G 9/46* (2013.01); *A23G 9/20* (2013.01); *A23G 9/38* (2013.01); *A23V 2002/00* (2013.01)

(58) Field of Classification Search
None
See application file for complete search history.

(56) References Cited

U.S. PATENT DOCUMENTS

| 3,475,181 A | 10/1969 | Kracauer |
| 5,082,682 A * | 1/1992 | Peterson ................ A23G 9/045 426/564 |
| 6,379,724 B1 | 4/2002 | Best et al. |

(Continued)

FOREIGN PATENT DOCUMENTS

| EP | 1342418 | 9/2003 |
| EP | 2145546 | 1/2010 |

(Continued)

OTHER PUBLICATIONS

Chile Office Action for Application No. 20151135, dated Feb. 14, 2017, 12 pages.

(Continued)

*Primary Examiner* — Tamra L Dicus
(74) *Attorney, Agent, or Firm* — K&L Gates LLP

(57) ABSTRACT

The present invention relates to a frozen confection product comprising glucono-delta-lactone. The present invention also relates to a method of producing a frozen confection product by adding glucono-delta-lactone to an ingredient mix and then homogenize, pasteurize, and freeze the mix. Preferably the method includes a post pasteurization acidification step. Preferably the method uses a standard freezing step followed by low temperature freezing.

12 Claims, 4 Drawing Sheets

(56) References Cited

U.S. PATENT DOCUMENTS

| | | | | |
|---|---|---|---|---|
| 2005/0042333 A1* | 2/2005 | Bartkowska | ............. | A23G 9/04 |
| | | | | 426/101 |
| 2006/0134297 A1* | 6/2006 | Bell | ................ | A23C 9/1504 |
| | | | | 426/582 |
| 2010/0247723 A1* | 9/2010 | Rudolph | .............. | A23G 9/04 |
| | | | | 426/329 |

FOREIGN PATENT DOCUMENTS

| | | |
|---|---|---|
| GB | 2048047 | 12/1980 |
| JP | 04187050 | 7/1992 |
| RU | 2444900 | 3/2012 |
| WO | 2003024233 | 3/2003 |
| WO | 2012016854 | 2/2012 |
| WO | 2014067789 | 5/2014 |
| WO | 2014067790 | 5/2014 |

OTHER PUBLICATIONS

Office Action issued in related Russian Patent Application No. 2015120575 dated May 17, 2017.

* cited by examiner

FROZEN CONFECTION PRODUCT AND A METHOD OF PREPARING SUCH

CROSS REFERENCE TO RELATED APPLICATIONS

The present application is a National Stage of International Application No. PCT/EP2013/071729, filed on Oct. 17, 2013, which claims priority to International Application No. PCT/US2012/062817, filed on Oct. 31, 2012, the entire contents of which are being incorporated herein by reference.

TECHNICAL FIELD OF THE INVENTION

The present invention relates to a frozen confection product. In particular the present invention relates to a frozen confection product comprising glucono-delta-lactone.

Furthermore, the invention relates to a method of producing an aerated frozen confection product comprising glucono-delta-lactone, as well as a frozen confection product obtainable by said method.

BACKGROUND OF THE INVENTION

Frozen confections such as ice cream are popular products. The products are especially popular amongst consumers at summertime, but are also popular during other seasons.

Furthermore, consumers of frozen confections demand more and more for products which are natural. Consumers demand products which are free of artificial (non-natural) emulsifiers and stabilisers, but at the same time consumers demand products which are low-fat and have a rich and creamy texture. Most frozen confection products currently being on the market contain non-natural emulsifiers and/or stabilizers.

Furthermore, there is an existing demand from consumers of frozen confections to buy frozen confections prepared from low fat formulations, while maintaining their good sensorial properties or even improve the sensorial properties, as low fat products are perceived to have health benefits. Unfortunately, low fat alternatives available rely even more than higher fat alternatives on emulsifiers and stabilizers to attain a pleasant mouth texture, such as a smooth creamy texture.

The prior art discloses different ways of improving the texture and sensorial properties of low fat frozen confection products.

For example low-temperature extrusion or low-temperature freezing is a technology that has been developed and which has been used to confer enhanced organoleptic properties to frozen confection products. Examples of such frozen confections include ice cream, frozen yoghurt, sherbet etc.

Such a method is described for instance in a general way in the following published documents, WO 2005/070 225, WO 2006/099 987, EP 0 713 650, U.S. Pat. No. 7,261,913 and more recently US 2007-0 196 553.

EP 1 342 418 teaches a method for preparing a frozen ice cream containing an acid component but ensuring that at least one protein does not react with the acid. According to this teaching, the contact time between the acid and the protein should be kept to a minimum in order to avoid coagulation of protein.

In WO 2012/016 854 is described a frozen aerated confection product comprising a partially coagulated protein system having a pH between 6.3 and 5.6. The coagulated protein system has been obtained by adding an acidifying agent, for example molasses, organic acids, such as citric acid, ethylenediaminetetraacetic acid (EDTA), or fruit derived acids.

However, the use of many organic acids like citric acid has a limitation in the amount which can be added to an edible product such as a frozen dairy dessert. Due to the acidity of citric acid, it limits the amounts used to attain a pH of 6.0. If more citric acid is used to pH below 6.0, the product prepared will have an unwanted sour aftertaste.

Furthermore, the use of citric acid gives mix processing limitations. The use of citric acid together with heat during the pasteurization process leads to partial coagulation of the protein in the system. However, the degree of denaturation (partial coagulation) is when using citric acid not controllable if the pH reaches below 6.0 and if the temperature goes above 85° C. Under such conditions higher amount of denaturation (precipitation) occur which may cause fouling of the pasteurizer plates and also contributing strong sour taste in the final product.

Hence, there is a need for a milder acidic solution for better control of processing parameters while obtaining a product with a rich, creamy texture.

Further, there is an unmet need for a method of preparing frozen confection products where pH can be slowly lowered and where a product is prepared which has improved textural and sensorial properties but no sour or acidic aftertaste.

Further, there is a need for frozen confections, in particular low fat products, which are free from artificial stabilizers and non-natural emulsifiers, but still have a smooth and creamy texture.

SUMMARY OF THE INVENTION

Thus, the object of the present invention relates to providing frozen confection products which have improved textural and sensorial properties such as a good creamy texture, and where the products do not have an acidic aftertaste.

It is a further object of the invention to provide frozen confection products with an enhanced protein coagulation and aggregation for enhanced creaminess.

It is a further object of the invention to provide frozen confection products devoid of artificial stabilizers and non-natural emulsifiers.

In particular, it is an object of the present invention to provide a frozen confection product having an improved protein denaturation and aggregation in order to obtain a product with an improved rich and creamy texture. Furthermore, it is an object of the present invention to obtain a frozen confection product with a low pH, resulting in an improved texture but without impacting on the flavour profile, i.e. a clean taste and no sour or acidic after taste.

Thus, one aspect of the invention relates to a frozen confection product comprising glucono-delta-lactone.

A further aspect of the invention relates to a method of producing a frozen confection product, comprising the steps of:
a) providing an ingredient mix comprising one or more proteins;
b) addition of glucono-delta-lactone to the ingredient mix
c) homogenizing the mix;
d) pasteurizing the mix;

e) freezing the pasteurized mix to form the frozen confection product;

f) optionally hardening the frozen confection product.

The inventors of the present invention have surprisingly found that using glucono-delta-lactone, which is normally used in cheese manufacturing instead of citric acid, in preparing a frozen confection product, pH can be lowered and thus an increased aggregation of proteins in the product can be obtained and the product will have an improved rich, smooth and creamy texture. At the same time the use of glucono-delta lactone will result in a product having a good taste which is not impaired by the addition of acid, i.e. the product has a desired taste and no after taste of acid. On the contrary, the use of citric acid to a pH below 5.6 will result in a product with a sour taste. A sour taste in ice cream is perceived negatively by many consumers and is therefore to be avoided. Furthermore, the inventors have found that using GDL as acidifying agent, control of process parameters is obtained even at low pH (e.g. below 6.0) and at high temperatures (e.g. above 85° C.) and no fouling of the process equipment is found.

Furthermore, by use of glucono-delta-lactone in preparing frozen desserts, the protein coagulation obtained is sufficient to provide a smooth and creamy texture to the confection product without the use of non-natural stabilizers or other conventional artificial additives used for this purpose.

Another aspect of the present invention relates to a frozen confection product obtainable by said method.

Figure 1:
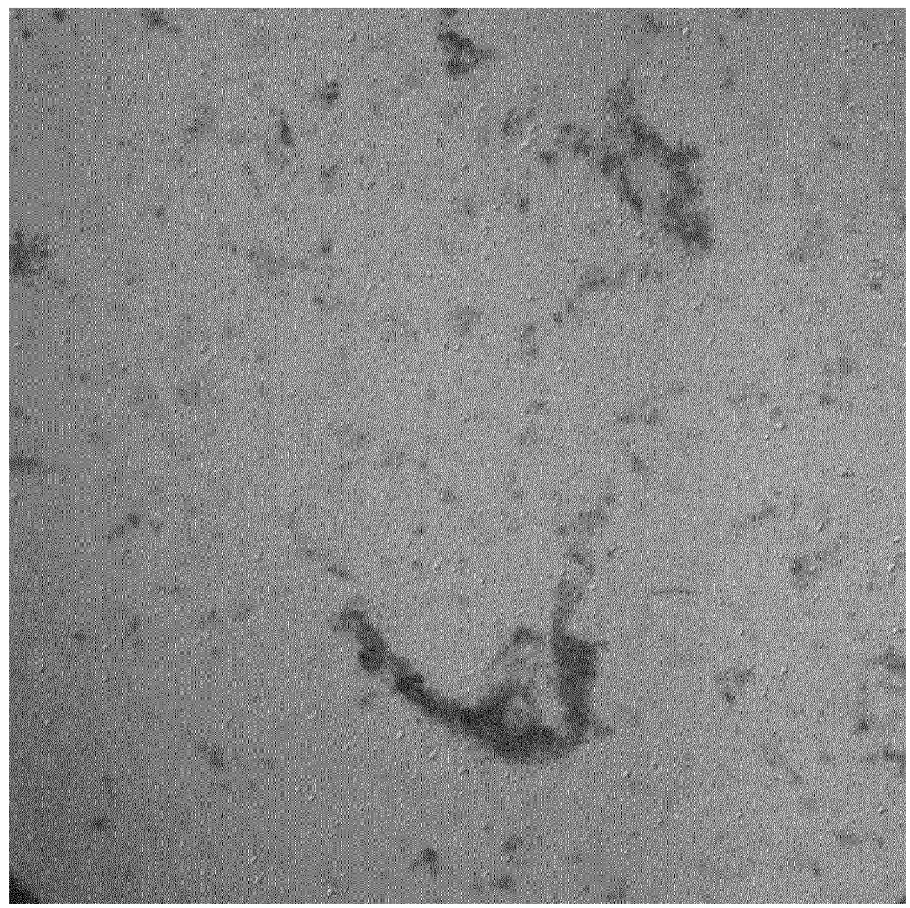
FIG. 1 shows an optical microscopic picture of a frozen dessert acidified with glucono-delta-lactone.

The present invention will now be described in more detail in the following.

DETAILED DESCRIPTION OF THE INVENTION

Definitions

Prior to discussing the present invention in further details, the following terms and conventions will first be defined:

In the context of the present invention, mentioned percentages are weight/weight percentages unless otherwise stated.

The term "and/or" used in the context of the "X and/or Y" should be interpreted as "X", or "Y", or "X and Y".

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 1 to 8, from 3 to 7, from 4 to 9, from 3.6 to 4.6, from 3.5 to 9.9, and so forth. All references to singular characteristics or limitations of the present invention shall include the corresponding plural characteristic or limitation, and vice versa, unless otherwise specified or clearly implied to the contrary by the context in which the reference is made.

Unless defined otherwise, all technical and scientific terms used herein have the same meaning as commonly understood by one of ordinary skill in the art (e.g. in frozen confection manufacture). Definitions and descriptions of various terms and techniques used in frozen confection manufacture are found in ice Cream, $6^{th}$ Edition, Robert T Marshall, H. Douglas Goff and Richard W Hartel (2003), Kluwer Academic/Plenum Publishers.

Frozen Confection Product:

In the context of the present invention the term "frozen confection product" means a confection product comprising ice crystals distributed throughout a sweetened and/or flavoured aqueous product and typically having a refreshing and cooling effect with a nice appearance.

Frozen confections include water in the form of ice crystals and are for consumption in a frozen or semi-frozen state, i.e. under conditions wherein the temperature of the product is less than 0° C., and preferably under conditions wherein the product comprises a significant amount of ice crystals.

Frozen confections may also be called "frozen confectioneries", "frozen confection products", "ice desserts" or "frozen desserts" and these terms may be used interchangeably.

In an embodiment of the invention the frozen confection product is an aerated frozen confection product, in particular an aerated frozen dairy dessert.

By the term "frozen aerated confection product" is meant any aerated frozen dessert.

In the context of the present invention, the term "aerated" relates to a product which have air cells distributed evenly throughout the product. The air cells or air bubbles can be distributed throughout the product for example by extrusion or whipping air into the product. For example, one volume part of air whipped into one volume part of ice cream mix is equal to 100% overrun, as described in Marshall, Golf and Hartel.

In an embodiment of the present invention, the product has an overrun of at least 20%, such as in the range of 20-150%, preferably in the range of 80-130%, even more preferably in the range of 100-130%.

Overrun relates to the amount of air whipped in to an ingredient mix for preparing aerated products. Overrun is a term generally recognized for the skilled person within the field of ice cream production and in the present invention overrun is defined as the increase in volume, in percentage, of ice cream greater than the volume of the mix used to produce that ice cream. In other words, if you start off with 1 liter of mix and you make 2.0 liters of ice cream from that, you have increased the volume by 100% (i.e., the overrun is 100%).

In an embodiment of the invention, the frozen confection may be selected from the group of frozen dairy dessert, cultured frozen dairy dessert, ice cream, non-fat ice cream, low-fat ice cream, frozen yoghurt, milk shake, milk ice and sherbet.

In a preferred embodiment, the frozen confection product is an ice cream, which may be a full fat ice cream, low fat ice cream and fat free ice cream.

In an embodiment of the invention, the frozen confection product comprises from 0.5% to 20% fat by weight.

In another embodiment of the invention, the frozen confection product is a low-fat product and comprises at most 6% fat by weight.

In the context of the present invention, the term "fat" should be interpreted broadly and generally relates to one or more triglycerides independent of their melting temperature.

The term "fat" comprises both triglycerides that are in liquid form at 25° C., as well as triglycerides that are in solid or semi-solid form at 25° C. Fatty acid triesters of the trihydroxy alcohol glycerol which are present in plant and animal tissues that can occur both as liquid or semi-liquid or solid fat forms. The physical and chemical properties of fats and oils depend on the nature of the fatty acids present. Saturated fatty acids give higher melting fats and represent solid fats, for example lard and butter. Unsaturated fats lower the melting point of fatty acids and fats, e.g. plant oils contain large amounts of unsaturated fatty acids.

Glucono-Delta-Lactone

Glucono-delta-lactone is a mild and weak acid which is readily available in nature. Glucono-delta-lactone can for example be made via natural fermentation process of corn or rice or other corn based materials. In an aqueous solution glucono-delta-lactone will slowly be converted to gluconic acid. In aqueous solutions there is equilibrium between gluconic acid and the delta and gamma lactones. This change in molecular form contributes to its unique function. Glucono-delta-lactone converts slowly (hydrolysis) to gluconic acid over 40 to 60 minutes after dissolution, and therefore it provides a gradual, progressive and continuous decrease of pH to equilibrium. Glucono-delta-lactone has a specific functionality of reducing pH slowly and gradually, even during storing conditions. The equivalent point and the rate of transformation of glucono-delta-lactone are related to concentration, temperature and pH value. This slow dissociation rate of glucono-delta-lactone, even dissociation in the finished product result in a good coagulation of proteins.

Glucono-delta-lactone is known to be used in cosmetics and toiletry applications as a gentle acidifier and chelating agent. In the food industry, it is known to be used in cheese manufacturing.

Glucono-delta-lactone added to an ingredient mix for preparing frozen confection products comprising proteins will result in coagulation or aggregation of said proteins. It was however very surprising to the inventors of the present invention that the use of Glucono-delta-lactone would increase the protein aggregation in frozen dairy desserts as compared to the use of other acids, such as citric acid.

Due to glucono-delta-lactone's very slow dissociation it coagulates proteins good and even under storage. Further, because of glucono-delta-lactone's mild taste it can be added in amounts high enough to ensure protein coagulation without giving the products obtained an off taste.

Protein aggregation has normally been perceived negatively, but it was surprisingly discovered that frozen desserts with controlled protein aggregation had an improved creamy texture than other products. This is due to an increased viscosity and due to controlled protein aggregation as well as increased water-binding. On the contrary, if using an acid as citric acid the viscosity in the product will not increase. Thus, products acidified with citric acid will need a gum or other stabilizer or emulsifier for the viscosity to increase. Thus, by the present invention, lower ingredients are needed to prepare a product which has a smooth creamy texture as compared to traditional products on the marked. One advantage of using glucono-delta-lactone over citric acid is that pH can be lowered while maintaining a good control over processing and the product attributes (taste and texture).

Another advantage of using glucono-delta-lactone instead of citric acid is that the process parameters can be controlled when using glucono-delta-lactone at low pH values and high temperatures. The use of citric acid and heat will cause fouling of process equipment.

Since glucono-delta-lactone is a mild acid, it can be added to an ingredient mix for preparing dairy frozen confection product in amount which will lower the pH of the product as compared to when using citric acid without impairing the taste of the product. If adding high amounts of citric acid to a frozen dairy dessert the taste of the product will be impaired since the product will have a sour, acidic off taste and after taste. With the present invention, pH can be lowered to a pH in the range of from 5.0 to 6.5 and still maintaining a creamy texture without any sour perception or taste.

Other acids such as acetic acid and lactic acid is not suitable to use in preparation of frozen confections since they have a very strong sour taste and therefore would give a frozen confection a bad taste.

In an embodiment according to the present invention, the glucono-delta-lactone is added to adjust pH of the ingredient mix to from 5.0 to 6.3, such as in the range of 5.3 to 6.0, even more preferably in the range of 5.4 to 5.9, such as in the range of 5.5 to 5.8.

In an embodiment of the present invention, the glucono-delta-lactone is added to the ingredient mix in an amount of 0.05 to 2.0% by weight, preferably in an amount of 0.06 to 1% by weight, such as 0.07 to 0.8% by weight, even more preferably in an amount of 0.1 to 0.3% by weight.

Protein:

The confection product according to the present invention comprises one or more proteins. The proteins may be selected from any dairy protein and plant protein.

In a preferred embodiment of the present invention, the protein is a dairy protein. The protein may also be a plant protein such as soya protein, pea protein, wheat protein, corn protein, and rice protein, proteins from legumes, cereals and grains in general. The protein may also be protein isolates from nuts or seeds.

The proteins present in the ingredient mix to prepare the frozen confection product according to the present invention are partially coagulated due to the addition of glucono-delta-lactone.

The term "partially coagulated proteins" is to be understood to mean a complex or an aggregate resulting from at least a partial coagulation of proteins present in the ingredient mix. This coagulation is induced by the presence of glucono-delta-lactone combined with a heat treatment.

Preferably, the proteins are dairy proteins which are usually present in an ice cream mix and which comprises casein and/or whey proteins. Such proteins may undergo partially coagulation.

Most milk proteins (mainly caseins) in their native state remain in colloidal suspension form leading to minimal changes to mix viscosity (~200-400 cp). However, when proteins are subjected to controlled exposure to known amounts of heat and acid (e.g., pH of 6.1 or less and pasteurization) they undergo coagulation. Coagulation is a state where the proteins are hydrated resulting in a three dimensional network (soft gel) causing increased mix viscosity (~199-2400 cp). If the exposure of proteins to heat and acid is not controlled, this phenomenon could lead to precipitation (e.g. syneresis in yoghurt).

The partially coagulated proteins as a result from addition of glucono-delta-lactone and heat treatment is characterized by the presence of a significant volume density measured by the particle peak area which is greater than 40%, preferably greater than 50%, such as greater than 60%, even more preferably greater than 70%.

When proteins in an ice cream ingredient mix is manipulated by decreasing pH and exposing the mix to controlled heat, it is believed that protein denaturation and subsequent aggregation occurs as heat unfolds whey protein and acidic conditions destabilises casein micelles. By protein aggregation the large milk protein structure in an ice cream mix is broken into smaller proteins, i.e. the proteins are un-folded. These unfolded proteins have the ability to increase the water holding capacity and form a unique 3-D network. Furthermore, protein aggregates form a network that is suspected to entrap water and fat globules and increases mix viscosity to create a uniquely smooth, creamy texture that mimics the presence of higher fat levels.

Without being bound by any theory, it is believed that partial coagulation of proteins within the ice cream mix is providing freshly coagulated proteins that act as a natural stabilizer for the air cells and enable creation of a very fine and stable microstructure resulting in a smooth, rich and creamy product without the use of artificial or non-natural emulsifiers or stabilisers or similar additives. This makes the products more natural and desirable for consumers who wish to minimize their intake of such artificial or non-natural additives.

With the use of glucono-delta-lactone, it is on the contrary to the use of other acids possible to lower pH without getting a sour taste. Further, it is possible to add enough glucono-delta-lactone to an ingredient mix to obtain good protein coagulation but without impairing the taste.

Method:

The method according to the present invention relates to preparing a frozen confection product by
a) providing an ingredient mix comprising one or more proteins;
b) addition of glucono-delta-lactone to the ingredient mix;
c) homogenizing the mix;
d) pasteurizing the mix;
e) freezing the pasteurized mix to form the frozen confection product;
f) optionally hardening the frozen confection product.

The present invention reflects an optimized method of preparing frozen confections by the controlled use of glucono-delta-lactone as acidifying agent and controlled heat conditions. Glucono-delta-lactone is preferably added to adjust pH to 5.0 to 6.5. The decrease of pH by addition of the mild acid glucono-delta-lactone and the exposure to controlled heat, result in protein aggregation and thus changes in structure in a frozen dessert, such as ice cream. The proteins will under acidic and subsequent heat conditions denaturate and subsequently aggregate as heat unfolds the whey protein and acidic conditions destabilises casein micelles. These protein aggregates form a network that is suspected of entrapping water and fat globules and increases mix viscosity to create a uniquely smooth, creamy texture that mimics the presence of higher fat levels.

The inventors of the present invention have surprisingly found that the use of glucono-delta-lactone as acidifying agent will enhance the protein coagulation and thus the textural properties of a frozen dessert even at low fat and calorie contents as compared to the use of other acids, such as citric acid.

In a preferred embodiment of the invention the method relates to producing a frozen aerated confection product.

Continuous pasteurization is performed under standard conditions and may be carried out prior to or after homogenisation. Preferred pasteurization conditions include heating to a temperature between 75° C. to 90° C., such as between 80° C. to 90° C., even more preferably between 83° C. to 87° C. for a period of 30 to 120 seconds, preferably from 30 to 60 seconds.

Batch pasteurization is preferably performed by heating to a temperature between 69° C. to 85° C., such as between 70° C. to 80° C. for a period of 30 to 120 minutes. Frozen yoghurt is preferably made by batch pasteurization while an ice cream preferably is made by continuous pasteurization.

Homogenisation can be done either prior or after pasteurization. It is preferably carried out under standard conditions, namely at a pressure of between 40 and bars, preferably between 100 and 150 bars, more preferably between 120 and 140 bars.

The homogenised mix may then be cooled to around 2 to 8° C. by known means. The mix may further be aged for 4 to 72 hours at around 2 to 6° C. with or without stirring. Optionally, the addition of flavourings, colourings, sauces, inclusions etc. may be carried out after ageing and before freezing. If flavourings, colourings, sauces, inclusions etc. are added, these are preferably selected from natural ingredients only.

In the next step, the mix is frozen. In an embodiment of the invention the freezing is made while aerating the pasteurized mix. In a preferred embodiment, the mix may be cooled to a temperature below −3° C., preferably between −3 and −10° C., even more preferably between at about −4.5 to −8° C. with stirring and injection of a gas to create a desired overrun.

In an embodiment according to the present invention, the freezing step is in combination with aerating the mix to an overrun at least 20%. The aerating may be performed to an overrun from 20 to 150%, preferably from 50 to 140%, such as from 80-135%, and even more preferably from 100 to 130%.

In an embodiment of the invention, the method further comprises a step of adjusting the pH of the mix after pasteurization, in particular adjusting the pH of the mix with an acidifying agent to a pH in the range of 5.0 to 6.5, preferably 5.1 to 6.3, such as 5.2 to 6.0, preferably 5.3 to 5.9, even more preferably 5.5 to 5.8.

This post pasteurization acidification step is preferably made with glucono-delta-lactone as acidifying agent. Acidification after pasteurization will result in even better protein coagulation and thus a product with even better smooth and creamy texture. It is possible to acidify after pasteurization because the product does not comprise any gums or other stabilizer. Thus, there is room for protein coagulation.

The aerated mix is then subjected to freezing either by using conventional freezing equipment or by using a low temperature extrusion system. The frozen mix is then packaged and stored at temperatures colder than −20° C., where it will undergo hardening step during storage. Alternatively, it can be hardened by accelerated hardening step, for example via a hardening tunnel, carried out at a temperature between −20° C. to −40° C. for a sufficient time to harden the product.

The method of the invention lends itself to the manufacture of frozen confections which are more stable at the necessary storage temperatures and have superior organoleptic and textural properties.

The Freezer:

In an embodiment according to the present invention, the freezing in step e) is made by using a standard continuous industry freezer, such as a Taylor freezer.

In a preferred embodiment of the invention, the primary freezing step in step e) is followed by a low temperature freezing process. The low temperature freezing, may also be termed low temperature extrusion, is reducing the product temperature to below −10° C., preferably between −12° C. and −18° C. The screw extruder may be such as that described in WO 2005/070225. The extrusion may be performed in a single or multi screw extruder.

A product prepared by the present method which further has been subjected to low temperature freezing or low temperature extrusion is thus another object of the present invention.

In an embodiment of the invention, the low temperature freezing is performed in a single or multi-screw extruder.

Low temperature extrusion is a known method which imparts to the final product a specific and advantageous microstructure. For instance, ice crystal size and air bubble size tend to be smaller than in traditional manufacturing processes. On the other hand, the size of fat globules does not change significantly when low temperature extrusion is used.

The method according to the present invention using glucono-delta-lactone will result in products with an even better structure with low temperature freezing in addition to conventional freezing than compared to existing low temperature extruded products.

In a preferred embodiment of the invention, the freezing is made first through a primary conventional freezer and then subsequently through a secondary low temperature freezer to achieve a creamy frozen dessert.

Products known which are made by low temperature freezing are described in US 2007/0 196 553, the content of which is here included by reference. For instance, ice crystal size and air bubble size tend to be smaller than in traditional manufacturing processes. Ice crystals, air cells, fat globules and agglomerates thereof shall be in a specific diameter in order to enhance positive sensory and stability characteristics.

The products obtained by the method according to the present invention, i.e. acidification with glucono-delta-lactone, and preferably in combination with low temperature freezing have a smoother mouth feel and have particular appealing textural and organoleptic properties, compared to low temperature extruded products known to date. Besides, the frozen confection product prepared by the method of the present invention is free of stabilizers, and non-natural emulsifiers.

Product:

In an aspect the present invention relates to a frozen confection product comprising glucono-delta-lactone.

In an embodiment of this aspect, the product of the invention is essentially or completely free of any artificial or non-natural emulsifier or stabilizer.

In an aspect the present invention relates to a frozen confection product obtainable by the method according to the present invention.

In a preferred embodiment the product is an aerated frozen confection product.

According to a particular embodiment of the present invention, the product comprises fat in an amount of 0-20% by weight, preferably 0-13%, milk-solid non-fat in an amount of 5-15% by weight, preferably 10-13%, a sweetening agent in an amount of 5-30%. Preferably, the product comprises 0.5 to 5.5% fat which is representative of a low-fat or non-fat product.

In the context of the present invention, the term "sweetening agent" means any compound bringing sweetness to the final product. Further, the sweetening agent enhances the flavour of the frozen confection prepared from the composition. Sweetening agent includes natural sugars like cane sugar, beet sugar, molasses, other plant derived nutritive sweeteners and non-nutritive sweeteners.

Examples of sweetening agent are sugar, sugar alcohol, natural sweetener, artificial sweetener and combinations thereof.

The product may additionally comprise flavourings, colourings, water or any mixtures thereof. Such flavourings or colourings, when used, are preferably selected from natural ingredients. These are used in conventional amounts which can be optimized by routine testing for any particular product formulation.

According to a specific embodiment of the invention, the product essentially consists of natural ingredients.

The term "essentially consist" means that at least 95% of the ingredients have to be natural, such as at least 97%, preferably at least 98%, even more preferably at least 99%.

The term "natural ingredients" refer in the context of the present invention to ingredients of natural origin. These include ingredients which come directly from the field, animals, etc. or which are the result of a physical or microbiological/enzymatic transformation process. These therefore do not include ingredients which are the result of a chemical modification process.

In another embodiment of the invention, the product is essentially or completely free of any artificial or non-natural emulsifier or stabilizer.

Examples of artificial and non-natural ingredients which are avoided in a particular embodiment of the invention include for example the following emulsifiers; mono- and diglyceride of fatty acids, acid esters of mono- and diglycerides of fatty acids such as acetic, lactic, citric, tartaric, mono- and diacetyl tartaric acid esters of mono- and diglycerides of fatty acids, mixed acetic and tartaric acid esters of mono- and diglycerides of fatty acid, sucrose esters of fatty acids, polyglycerol esters if fatty acids, polyglycerol polyricinoleate, polyethylene sorbitan mono-oleate, polysorbate 80 and, chemically extracted lecithins.

The term "artificial emulsifiers" may also be referred to as synthetic emulsifiers or non-natural emulsifiers and the terms may be used interchangeably.

Chemically modified starches which are used in the art as stabilizers are also preferably avoided. These include for example modified starch, monostarch phosphate, distarch phosphate, phosphate or acetylated distarch phosphate, acetylated starch, acetylated distarch afipate, hydroxyl propyl starch, hydroxypropyl distarch phosphate, acetylated modified starch.

The products of the present invention are preferably essentially free of the preceding synthetic esters and modified starches.

"Essentially free" means in the context of the present application, that these material are not intentionally added for their conventional property imparting abilities, e.g. stabilizing, although there could be unintended minor amounts present without detracting from the performance of the products. Generally and preferably, the products of the invention will not contain any non-natural materials.

By the term "essentially or completely free" is therefore meant that the product comprise 1% by weight or less of a given compound.

In an embodiment of the invention, the product has a pH in the range of 5.0 to 6.5, preferably from 5.1 to 6.3, such as in the range of 5.3 to 6.0, even more preferably in the range of 5.4 to 5.9, such as in the range of 5.5 to 5.8.

In another embodiment of the invention, the product is selected from the group of ice cream, non-fat ice cream, low fat ice cream, frozen yoghurt, frozen dairy dessert and cultured frozen dairy dessert.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

EXAMPLES

Example 1

A Frozen Dairy Dessert with Glucono-Delta-Lactone as Acidifying Agent

| Ingredient | Wt % of final product |
|---|---|
| Fat | 10-11% |
| MSNF | 10-12% |
| Sugar | 18-22% |
| Acacia gum | 0.1-0.5% |

The frozen dairy dessert was prepared by mixing the ingredients mentioned above and then add 0.15% by weight glucono-delta-lactone to reduce pH to 5.8-6.0. No other acidifying agent was added to the mix. Then, the acidified ingredient mix was homogenized at a stage one at 1500 psi and at stage two at 500 psi and subsequently pasteurized at 82° C. for 90 seconds. The pasteurized mix was then frozen by using a combination of a standard continuous industry freezer and low temperature freezing.

Example 2

A Frozen Dairy Dessert with Citric Acid as Acidifying Agent

| Ingredient | Wt % of final product |
|---|---|
| Fat | 10-11% |
| MSNF | 10-12% |
| Sugar | 18-22% |
| Acacia gum | 0.1-0.5% |

The frozen dairy dessert was prepared by mixing the ingredients mentioned above and then add 0.05% by weight citric acid to reduce pH to 6.0 to 6.3. No other acidifying agent was added to the mix. The acidified ingredient mix were then homogenized at a stage one at 1500 psi and at stage two at 500 psi and subsequently pasteurized at 82° C. for 90 seconds. The pasteurized mix was then frozen by using a combination of a conventional freezer and a low temperature freezing.

Example 3

Method of Preparing Optical Microscope Pictures of Sample of Ice Cream

A 0.2 gram sample of frozen dairy dessert was added to 1.8 grams of a stain solution consisting of 0.04% Toluidine Blue O in water. The sample was stirred to melt and disperse. After 60 seconds of equilibration, a drop of the mixture was placed onto a glass microscope slide and viewed at an effective magnification of approximately 100×.

Example 4

A Comparative Study of Ice Cream Prepared by Acidification with Glucono-Delta-Lactone and Citric Acid Respectively In this study the frozen dairy dessert of example 1 and 2 are compared.

Figure 2:
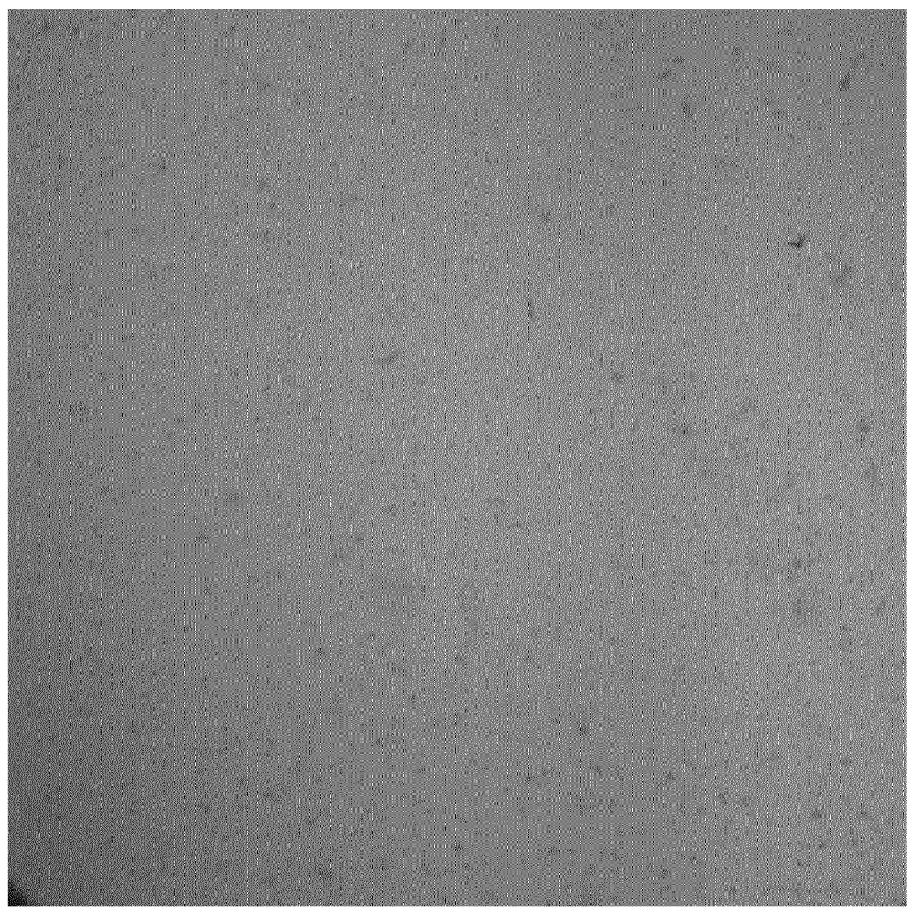
FIG. 2 shows and shows an optical microscopic picture of a frozen dessert acidified with citric acid.

Microscopic pictures of both frozen dairy desserts has been made, which are shown in FIGS. 1 and 2 respectively. In FIG. 1 is shown a microscopic picture of a frozen dessert which has been acidified by glucono-delta-lactone, where FIG. 2 shows a microscopic picture of a frozen dessert acidified with citric acid.

The pictures show the presence of protein aggregation in the samples of frozen dairy desserts using Toluidine Blue stain.

Figure 3:
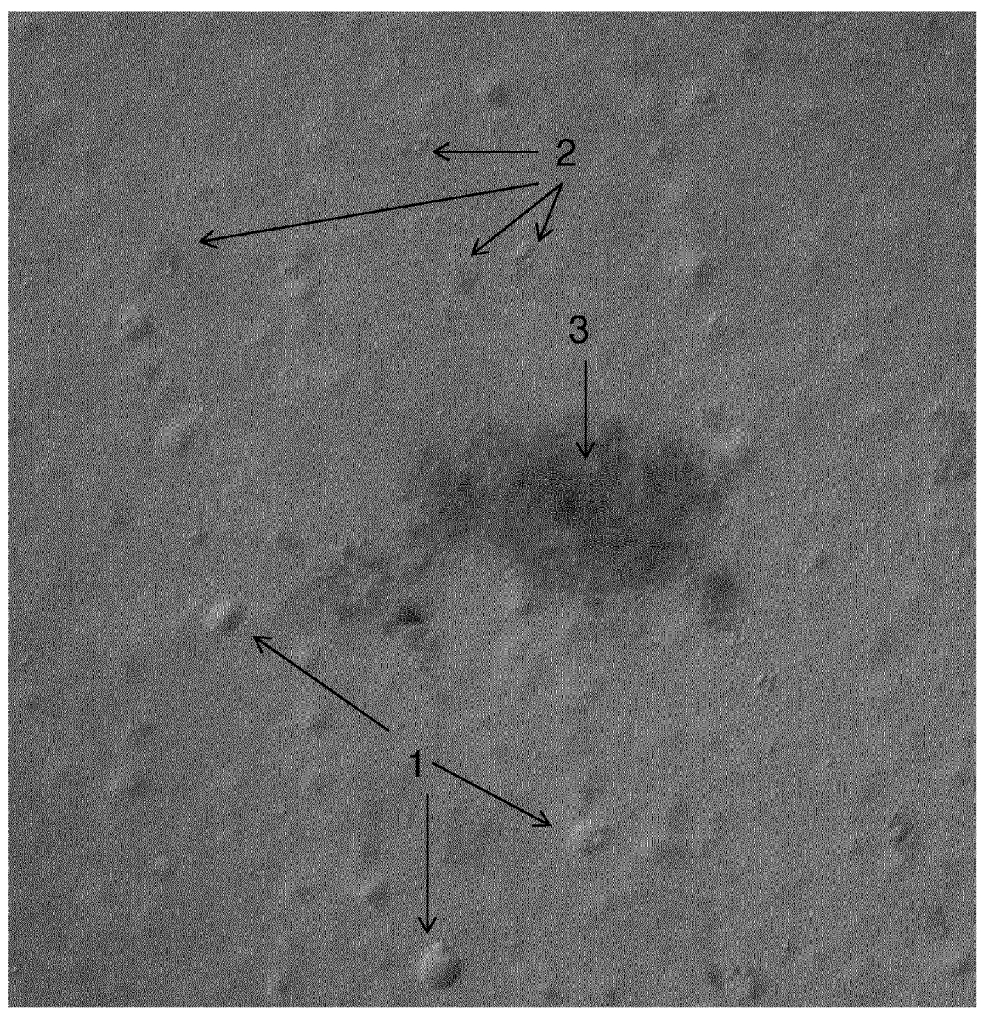
FIG. 3 shows an optical microscopic picture which is an enlargement of FIG. 1.

FIG. 1 clearly shows larger protein aggregation shown as a chain-like entity, while FIG. 2 only shows tiny flakes of protein aggregation. FIG. 3 is an enlargement of FIG. 1. FIG. 3 shows that a product obtained with glucono-delta-lactone has large single fat droplets (1) (up to 10 μm or more), along with smaller clusters of fat (2), which are consistent with the particle size peak at around 10 μm. FIG. 3 also shows protein aggregates between small fat droplets. Thus, preparation of dairy frozen desserts with glucono-delta-lactone as acidifying agent shows an enhanced protein aggregation and coagulation than frozen dairy desserts made with citric acid as the acidifying agent. With this larger protein aggregation in products prepared with glucono-delta-lactone as acidification agent instead of citric acid, product with an enhanced creaminess is obtained. Furthermore, no acidic aftertaste is obtained with glucono-delta-lactone.

When protein denaturation and coagulation occurs, the big milk protein structures in the ice cream mix are partially broken into smaller proteins, i.e. unfolding of the protein structure. These unfolded proteins, have the ability to increase the water holding capacity and form a unique 3-D network (trap water and small fat particles inside them). The protein coagulation therefore results in making ice creams which are thick and viscous when extruded, preferably through the low temperature freezer (LTF) and helps the ice cream product to attain a smooth and creamy texture.

Example 5

Volume-Based Particle Size Distribution and Volume Mean Diameter

Figure 4:
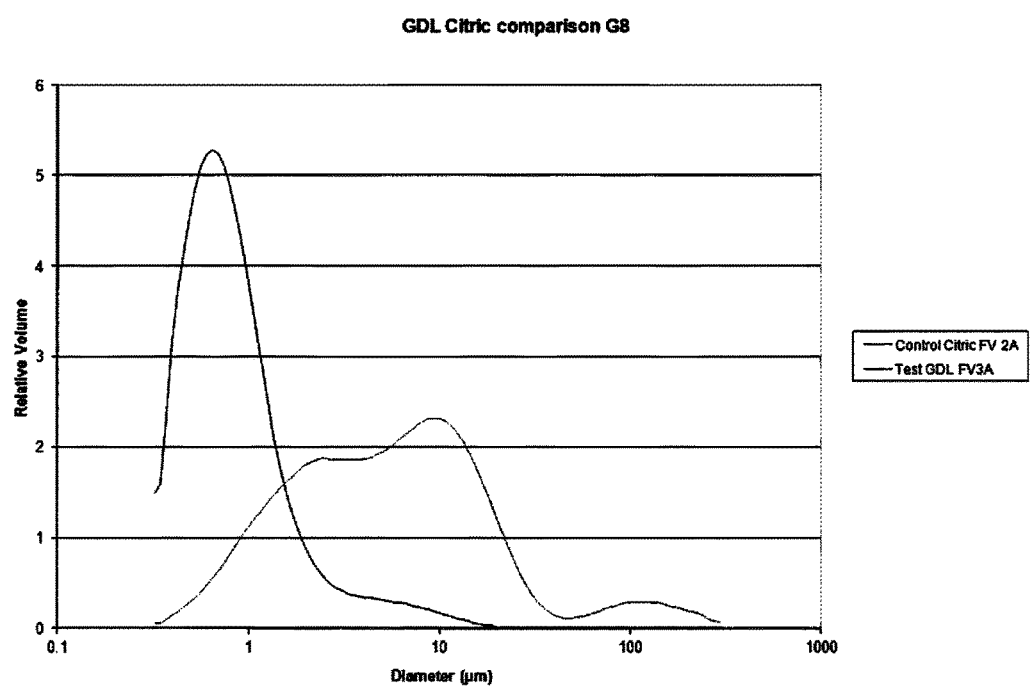
FIG. 4 shows particle size distribution of products with either citric acid or glucono-delta-lactone.

The difference in dairy frozen desserts acidified with glucono-delta-lactone and citric acid respectively have also been evaluated by measuring particle volume distribution with a laser diffraction particle size analyzer. FIG. 4 shows the particle size distribution of a sample prepared by acidifying with glucono-delta-lactone as compared to citric acid.

In the below table are the volume fraction (%) of fat droplets and clusters whose diameter is above 2.28 μm, an indication of fat clustering. Also shown is the volume-based mean diameter of the fat droplets and clusters, from a sample of the frozen dairy dessert given in example 1 and 2 respectively.

| Type of product | Volume fraction (%) >2.28 μm | Vol. mean Diameter (μm) |
| --- | --- | --- |
| As example 1 | 73.59% | 2.84 |
| As example 2 | 8.09% | 0.72 |

From the above table, it is disclosed that the volume fraction, above 2.28 μm diameter, and volume mean diameter of a product prepared by using glucono-delta-lactone as acidifying agent are much larger than when using citric acid. This indicates that more protein is getting aggregated and coagulated in products according to example 1 as compared to products according to example 2. Thus an improved network is obtained in products acidified with glucono-delta-lactone as compared to products acidified with citric acid.

Particle size distribution is measured by diluting approximately 2.5 g mix or frozen product in 10 parts by weight de-ionized water (approx. 25 g) and mixed until uniformly distributed. If frozen, the product will melt during this step.

Stirring rate is set to 1600 rpm.

The diluted mixture is then added slowly to the dispersion module of the particle size analyzer until the optimal concentration is reached, as indicated by the degree of light obscuration (17-20%). The sample is allowed to circulate through the measuring system for an additional 30 seconds before starting the measurement.

The invention claimed is:

1. A method of producing a frozen confection product, comprising the steps of:
    providing an ingredient mix comprising one or more proteins;
    adding glucono-delta-lactone to the ingredient mix to provide protein aggregation;
    homogenizing the ingredient mix;
    pasteurizing the ingredient mix before or after the homogenizing at a temperature from 75° C. to 95° C. for 30 to 120 seconds; and
    freezing and aerating the homogenized and pasteurized ingredient mix to an overrun of 100-130% to at least partially form the frozen confection product, the frozen confection product having a pH of 5.5-5.8.

2. The method according to claim 1, wherein the glucono-delta-lactone is added to adjust pH of the ingredient mix to 5.5-5.8.

3. The method according to claim 1, wherein the glucono-delta-lactone is added to the ingredient mix in an amount of 0.05-2.0% by weight.

4. The method according to claim 1, wherein the freezing uses a standard continuous industry freezer.

5. The method according to claim 1, wherein the freezing and aerating is followed by a low temperature freezing step.

6. The method according to claim 5, wherein the low temperature freezing is performed in a single or multi-screw extruder.

7. The method according to claim 1, wherein the adding of the glucono-delta-lactone to the ingredient mix is performed after the pasteurizing.

8. The method according to claim 1, wherein the ingredient mix comprises fat in an amount of 0-20% by weight, milk solid non-fat in an amount of 5-15% by weight, and a sweetening agent in an amount of 5-30% by weight.

9. The method according to claim 8, wherein the ingredient mix further comprises a component selected from the group consisting of flavors, colorings, water and mixtures thereof.

10. The method according to claim 1, wherein the one or more proteins are dairy proteins.

11. The method according to claim 1, wherein the adding of the glucono-delta-lactone to the ingredient mix is performed prior to the pasteurizing and the homogenizing.

12. The method according to claim 1, wherein the frozen confectionery product is free of gums.

* * * * *